(12) United States Patent
Itou et al.

(10) Patent No.: US 11,732,798 B2
(45) Date of Patent: Aug. 22, 2023

(54) TRANSMISSION CASE

(71) Applicants: JATCO Ltd, Fuji (JP); NISSAN MOTOR CO., LTD., Yokohama (JP)

(72) Inventors: Tsutomu Itou, Fujinomiya (JP); Aya Nakata, Fuji (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/763,564

(22) PCT Filed: Oct. 19, 2020

(86) PCT No.: PCT/JP2020/039219
§ 371 (c)(1),
(2) Date: Mar. 24, 2022

(87) PCT Pub. No.: WO2021/095445
PCT Pub. Date: May 20, 2021

(65) Prior Publication Data
US 2022/0341491 A1   Oct. 27, 2022

(30) Foreign Application Priority Data
Nov. 11, 2019 (JP) .................. 2019-204205

(51) Int. Cl.
*F16H 61/00* (2006.01)
*F16H 57/02* (2012.01)
*F16H 57/00* (2012.01)

(52) U.S. Cl.
CPC ......... *F16H 61/0009* (2013.01); *F16H 57/02* (2013.01); *F16H 2057/0056* (2013.01)

(58) Field of Classification Search
CPC ................. F16H 61/0009; F16H 57/02; F16H 2057/0056; F16H 61/0003; F16H 2057/02026; F16H 2057/02043
See application file for complete search history.

(56) References Cited

U.S. PATENT DOCUMENTS 4,850,669 A * 7/1989 Welker ............... G02B 23/2476
385/75
4,854,348 A * 8/1989 Tochikubo ......... G05D 23/1393
137/636.4
(Continued)

FOREIGN PATENT DOCUMENTS

JP          H 3-73754      *  7/1991
JP          H10-227352 A      8/1998
WO     WO 2019163316 A1 *  8/2019    ........... F16H 57/021

OTHER PUBLICATIONS

Google machine translation of JPH 03-073754, Komatsu Ltd., Jul. 24, 1991 (Year: 1991).*
(Continued)

*Primary Examiner* — Vinh Luong
(74) *Attorney, Agent, or Firm* — Foley & Lardner LLP

(57) ABSTRACT

A transmission case having a storage area inside for an assembling member, includes a first opening in the storage area; a seating portion provided in the storage area and on which the assembling member inserted from an opening direction of the first opening is to be seated; and a mirror-finished portion allowing an opposite portion of the assembling member facing the seating portion to be visually recognized when the assembling member is being inserted to the first opening from the opening direction.

5 Claims, 9 Drawing Sheets

(56) References Cited

U.S. PATENT DOCUMENTS

| | | | |
|---|---|---|---|
| 6,205,886 B1 | 3/2001 | Takeuchi | |
| 2015/0075311 A1* | 3/2015 | Kanzaki | F16H 57/02 |
| | | | 74/421 A |
| 2022/0056992 A1* | 2/2022 | Itou | F16H 57/02 |

OTHER PUBLICATIONS

English translation of PCT Written Opinion of the International Searching Authority, PCT/JP2020/039219, dated Dec. 8, 2020 (Year: 2020).*

* cited by examiner

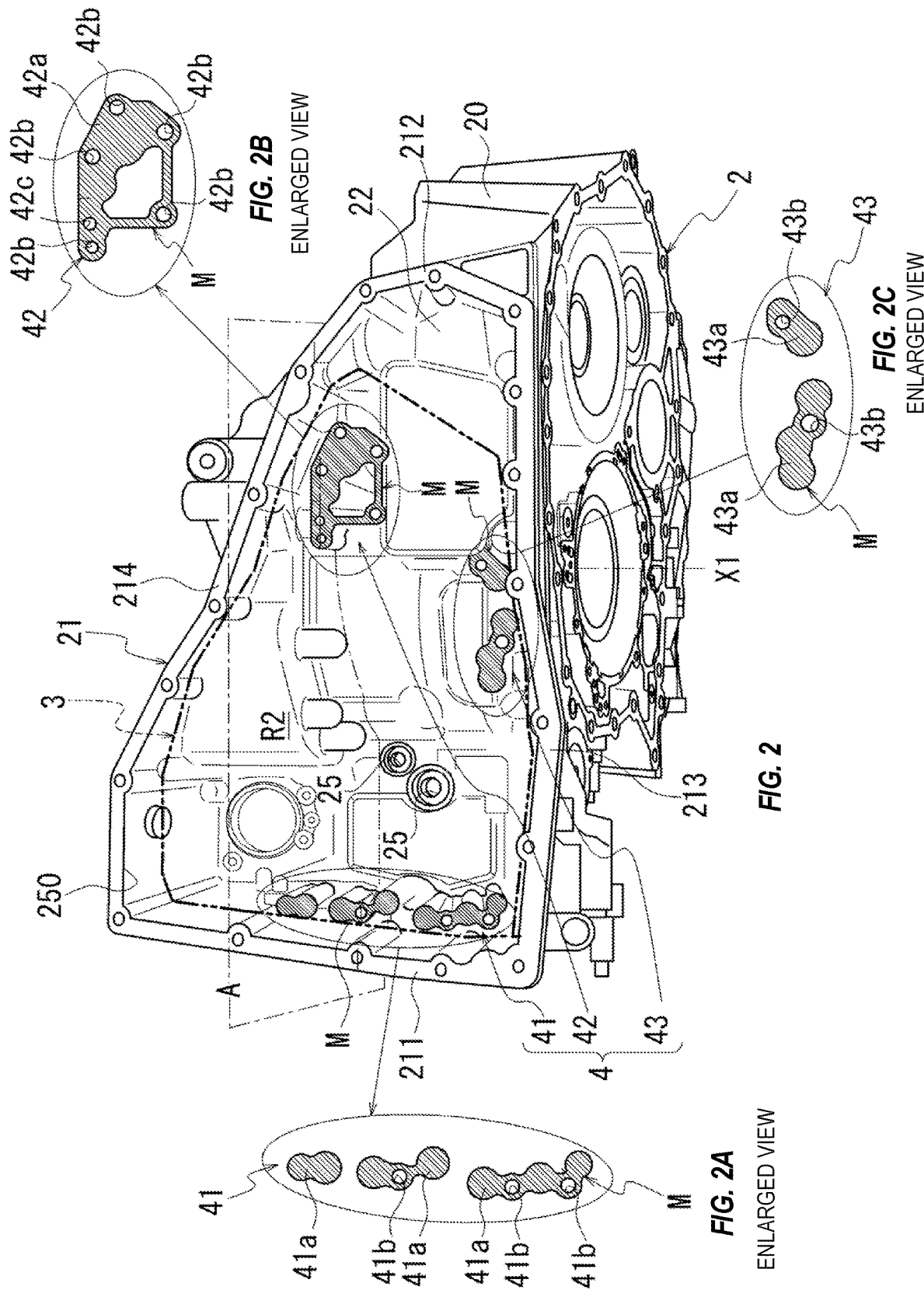

ENLARGED VIEW

ENLARGED VIEW

TRANSMISSION CASE

TECHNICAL FIELD

The present invention relates to a transmission case.

BACKGROUND ART

JP10-227352A discloses a control valve assembly that can be assembled in a predetermined position within a transmission case.

SUMMARY OF INVENTION

The control valve assembly is assembled to the transmission case by seating the control valve assembly in the predetermined position within the transmission case.

An operator visually seats the control valve assembly in the predetermined position while holding it with both hands.

However, depending on the shape of the transmission case and the control valve assembly, the seating portion may be located at the blind spot of the operator. It follows that the operator works in a situation where the seating portion is invisible, which lowers the work efficiency.

Therefore, it is required that the work efficiency shall not be lowered even when the seating portion is located at the blind spot of the operator.

According to an aspect of the present invention, a transmission case having a storage area inside for an assembling member, includes a first opening in the storage area; a seating portion provided in the storage area and on which the assembling member inserted from an opening direction of the first opening is to be seated; and a mirror surface portion allowing an opposite portion of the assembling member facing the seating portion to be visually recognized when the assembling member is being inserted to the first opening from the opening direction.

According to the above embodiment, it is possible to prevent the work efficiency from being lowered even when the seating portion is located at the blind spot.

BRIEF DESCRIPTION OF DRAWINGS

FIG. 2 is a perspective view of the transmission case in FIG. 1A viewed from the direction of the arrow II-II.

FIG. 2A, FIG. 2B, and FIG. 2C are enlarged views of portions of FIG. 2.

FIG. 3AA and FIG. 3AB are enlarged views of portions of FIG. 3A.

DESCRIPTION OF EMBODIMENTS

Hereinafter, this embodiment is described with an example in which the present invention is applied to a transmission case 2 of a continuously variable transmission 1 for a vehicle.

Figure 1A:
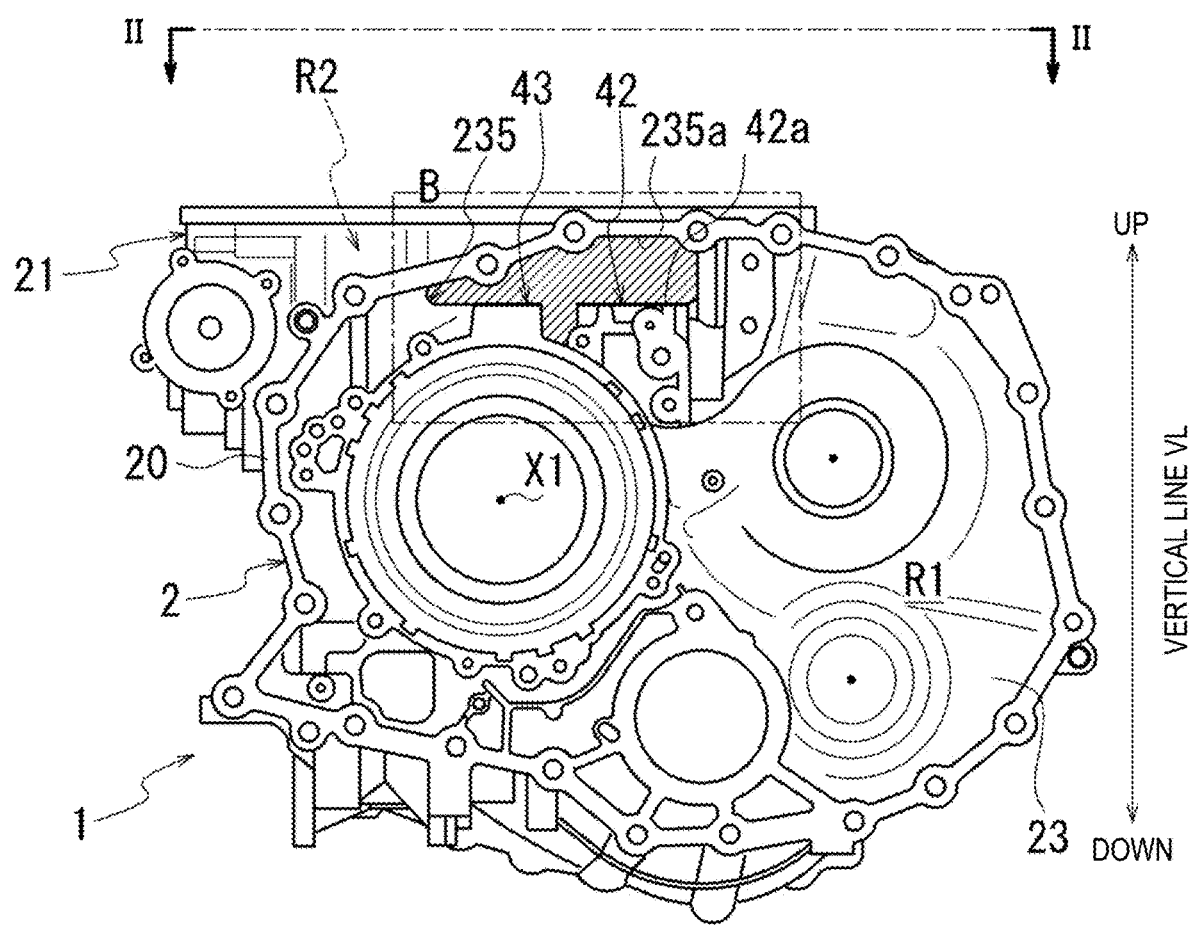
FIG. 1A is a view of a transmission case viewed from the converter housing side.
Figure 1B:
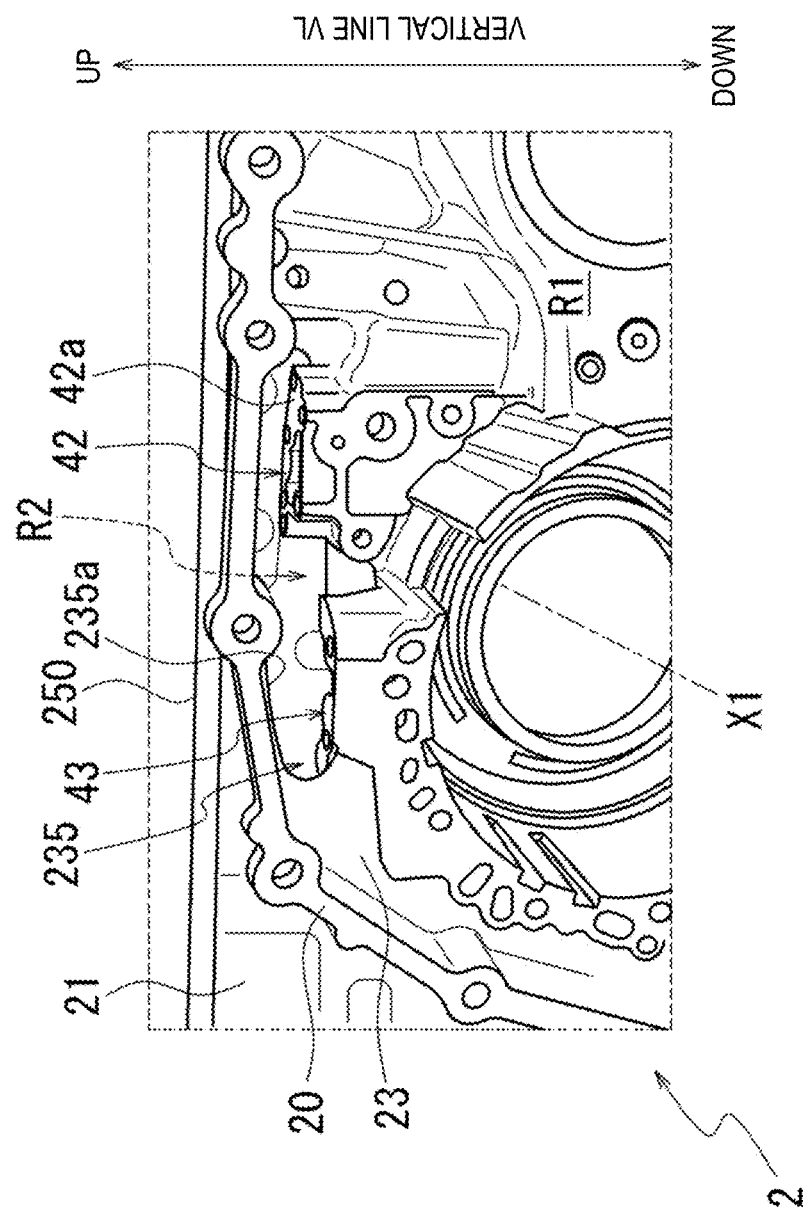
FIG. 1B is an enlarged perspective view of region B of FIG. 1A.

FIG. 1A, FIG. 1B are diagrams for describing the transmission case 2. FIG. 1A is a view of the transmission case 2 viewed from the converter housing. FIG. 1B is an enlarged perspective view of region B of FIG. 1A.

In FIG. 1A, the area of a communication hole 235 has been hatched for convenient viewing. In FIG. 1A, FIG. 1B, for convenience of description, the transmission case 2 is shown in a state where a valve housing chamber R2 faces upward in the vertical line VL direction. In the following description, the up-down direction means the upper and lower parts of the transmission case 2 in FIG. 1.

FIG. 2 is a diagram describing the transmission case 2, and is a perspective view of the transmission case 2 in FIG. 1A viewed from the direction of arrow II-II.

In FIG. 2, the control valve unit 3 is shown with virtual lines, and the mirror surface areas are hatched, with enlarged views of portions of FIG. 2 shown in FIG. 2A, FIG. 2B and FIG. 2C. Moreover, a positioning pin P is omitted.

Figure 3A:
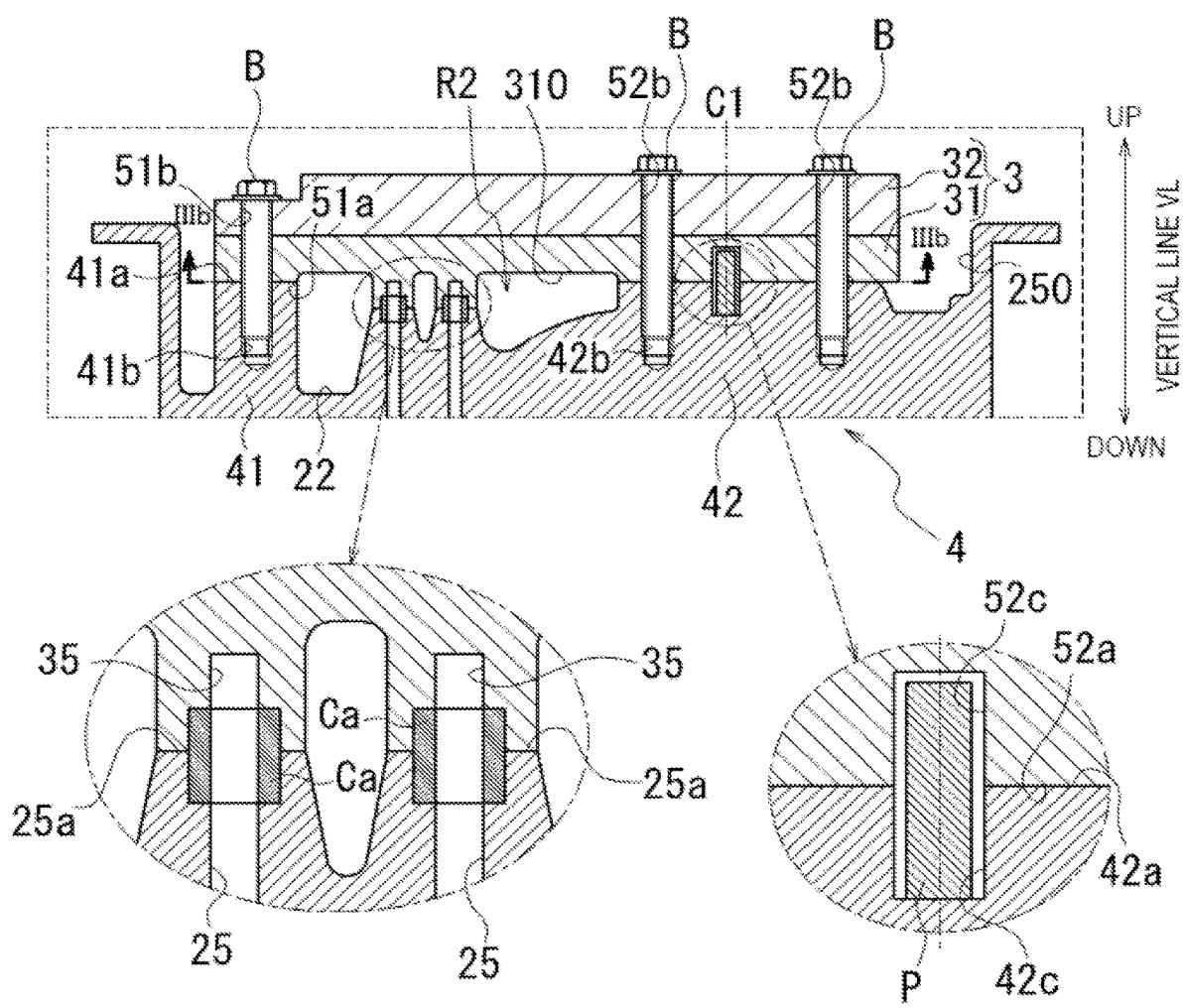
FIG. 3A is a schematic view of a cut surface of transmission case 2, taken along the surface A in FIG. 2.
Figure 3B:
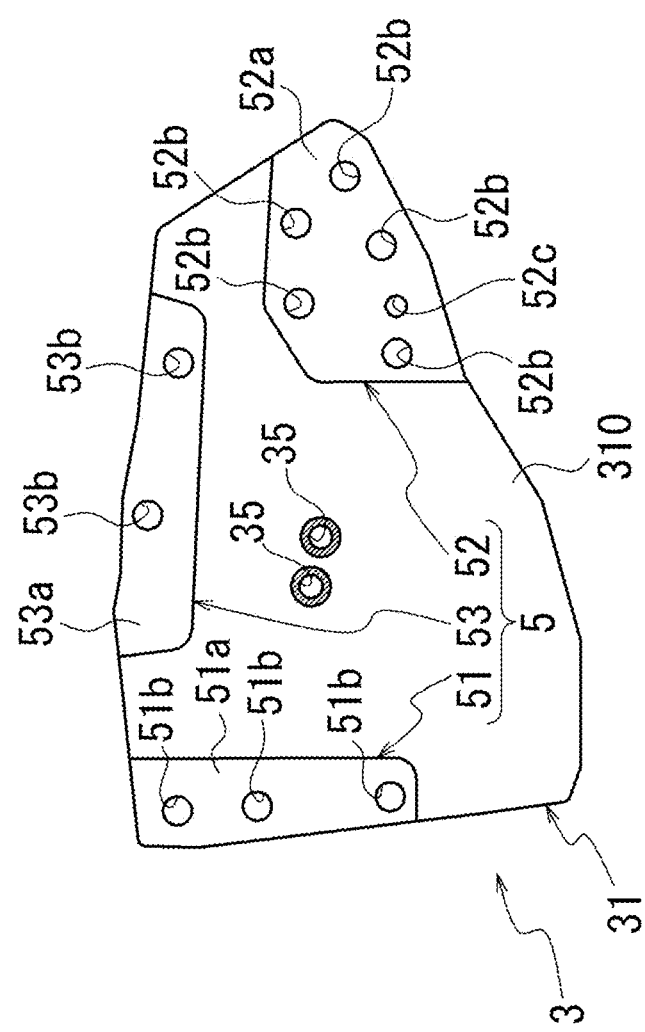
FIG. 3B is a schematic view of a cross section taken along the line IIIb-IIIb in FIG. 3A.

FIG. 3A, FIG. 3B are diagrams describing the transmission case 2. FIG. 3A is a schematic view of a cut surface of transmission case 2, taken along the surface A in FIG. 2. FIG. 3B is a schematic view of a cross section taken along the line A-A in FIG. 3A. Enlarged views of portions of FIG. 3A are shown in FIG. 3AA and FIG. 3AB.

In particular, in FIG. 3AB, the seating portion 4 is shown in an enlarged manner. Further, for convenience of description, the cross sections of oil passages 35, 35 of the control valve unit 3 and oil passages 25, 25 of the transmission case 2 are shown. In addition, in FIG. 3B, the seating portion 5 is shown in an enlarged manner.

Transmission Case 2

As shown in FIG. 1A, the transmission case 2 has an intermediate wall portion 23 in the internal space. The intermediate wall portion 23 intersects a rotational axis X1 of a torque converter (unshown) of the continuously variable transmission 1. The outer peripheral edge of the intermediate wall portion 23 is surrounded by the outer peripheral wall 20 around the entire circumference thereof.

The space R1 surrounded by the intermediate wall portion 23 and the outer peripheral wall 20 of the transmission case 2 houses a forward/reverse switching mechanism (unshown) or a final gear (unshown).

Valve Housing Chamber S3

As shown in FIG. 1A, a valve housing chamber R2 is provided on the upper side of the transmission case 2 in the vertical line VL direction. The valve housing chamber R2 houses a control valve unit 3 to be described later (with reference to virtual lines in FIG. 2).

As shown in FIG. 1A, the valve housing chamber R2 is an area surrounded by a peripheral wall portion 21 extending upward in the vertical line VL direction from the outer peripheral wall 20.

As shown in FIG. 2, the valve housing chamber R2 has an opening 250 that opens upward in the vertical line VL direction. Of the outer peripheral wall 20, the area surrounded by the peripheral wall portion 21 is a bottom wall portion 22 of the valve housing chamber R2. The bottom wall portion 22 intersects the vertical line VL and has a concave shape recessed in the direction away from the opening 250 in the vertical line VL direction (with reference to FIG. 3A).

Here, as shown in FIG. 1A, FIG. 1B, a part of the valve housing chamber R2 overlaps with the space R1 when viewed from the direction of the rotational axis X1. In the intermediate wall portion 23, a through hole 235 is formed in an area where the valve housing chamber R2 and the space R1 overlap.

The through hole 235 penetrates the intermediate wall portion 23 in the direction of the rotational axis X1 and communicates with the space R1 and the valve housing chamber R2 (in the following description, the through hole 235 is referred to as the communication hole 235). In the space R1, the communication hole 235 opens in a direction (rotational axis X1 direction) orthogonal to the opening direction (vertical line VL direction) of the opening 250.

Details will be described later, and the communication hole 235 has an opening area that allows an operator to look into the valve housing chamber R2 from the rotational axis X1 direction.

As shown in FIG. 2, the peripheral wall portion 21 has short wall portions 211, 212 along the rotational axis X1 direction and long wall portions 213, 214 connecting the ends of these short wall portions 211, 212. These short wall portions 211, 212 and long wall portions 213, 214 are provided in a manner of surrounding the opening 250.

As shown in FIG. 2, FIG. 3A, the valve housing chamber R2 is provided with a seating portion 4 on which the control valve unit 3 to be described later is seated. The seating portion 4 extends upward in the vertical line VL direction from the bottom wall portion 22 of the valve housing chamber R2.

In this embodiment, the seating portion 4 has a first seating portion 41 provided near the short wall portions 211, a second seating portion 42 provided near the long wall portions 214, and a third seating portion 43 provided near the long wall portions 213, and supports the control valve unit 3 from three places (with reference to FIG. 2).

The seating surfaces 41a, 42a, 43a of the first seating portion 41, the second seating portion 42, and the third seating portion 43, respectively, are flat surfaces orthogonal to the vertical line VL direction.

The seating surfaces 41a, 42a, 43a are mirror surfaces over the entire surface (with reference to the hatched portion in FIG. 2. Hereinafter, the mirror surface area is also referred to as a mirror surface portion M).

Here, a conventional seating surface is formed by milling so as to have a predetermined flatness. In a case where the seating surface is a mirror surface as in this embodiment, milling is not required. This is because a seating surface having a higher flatness than that of milling can be obtained by performing mirror finishing.

It is not necessary to mirror-finish all of the seating surfaces 41a, 42a, 43a. Details will be described later, but at least the seating surface 42a may be a mirror surface.

Bolt holes 41b, 42b, 43b are opened on the seating surfaces 41a, 42a, 43a, respectively. A plurality of these bolt holes 41b, 42b, 43b are provided along the overall shape of the control valve unit 3.

When viewed from the rotational axis X1 direction, a part of the third seating portion 43 and the second seating portion 42 are provided in an area overlapping the communication hole 235. The seating surface 42a of the second seating portion 42 is located on the lower side of the upper edge 235a of the communication hole 235 in the vertical line VL direction (with reference to FIG. 1A, FIG. 1B).

As shown in FIG. 3A, a pin hole 42c is opened on the seating surface 42a of the second seating portion 42, in addition to the bolt hole 42b. A positioning pin P is inserted into the pin hole 42c. The positioning pin P is inserted into the pin hole 42c so that the center line C1 of the positioning pin P is parallel to the vertical line VL.

Oil passages 25, 25 are provided in the bottom wall portion 22 of the valve housing chamber R2 (with reference to FIG. 2).

As shown in FIG. 3A, the oil passages 25, 25 extend in the vertical line VL direction away from the bottom wall portion 22. The oil passages 25, 25 communicate with an oil chamber (unshown) in the transmission case 2. Sealing materials Ca, Ca are internally fitted in the oil passages 25, 25, respectively. These sealing materials Ca, Ca project upward from tips 25a, 25a of the oil passages 25, 25.

Control Valve Unit 3

The control valve unit 3 has an overall shape that substantially matches the opening shape of the opening 250 of the valve housing chamber R2 (with reference to FIG. 2). The control valve unit 3 is supported in a manner of straddling the first seating portion 41, the second seating portion 42, and the third seating portion 43. The control valve unit 3 is provided across the upper side of the oil passages 25, 25 in the direction orthogonal to the vertical line VL (with reference to FIG. 3A).

As shown in FIG. 3A, the control valve unit 3 is configured by overlapping the upper valve 31 and the lower valve 32. A separate plate (unshown) is provided between the upper valve 31 and the lower valve 32. The upper valve 31 and the lower valve 32 each have oil passages (unshown) formed inside, and together with the separate plate, they form a hydraulic control circuit.

The control valve unit 3 is housed in the valve housing chamber R2 with the upper valve 31 facing downward, under a state where the upper valve 31 and lower valve 32 are overlapped along the vertical line VL direction. The lower surface 310 of the upper valve 31 is seated on the seating portion 4. In this state, the lower surface 310 faces the bottom wall portion 22 in the vertical line VL direction with a space therebetween.

As shown in FIG. 3B, the lower surface 310 of the upper valve 31 is provided with a seating portion 5 (first seating portion 51, second seating portion 52, third seating portion 53) that faces the seating portion 4 (first seating portion 41, second seating portion 42, third seating portion 43) in the vertical line VL direction. The seating portion 5 slightly protrudes from the lower surface 310 of the upper valve 31.

The seating surfaces 51a, 52a, 53a of the first seating portion 51, the second seating portion 52, the third seating portion 53, respectively, are flat surfaces orthogonal to the vertical line VL direction.

As shown in FIG. 3B, the through holes 51b, 52b, 53b are opened on the seating surfaces 51a, 52a, 53a, respectively. These through holes 51b, 52b, 53b are provided at positions corresponding to the bolt holes 41b, 42b, 43b. The through holes 51b, 52b, 53b penetrate the control valve unit 3 in the vertical line VL direction (with reference to FIG. 3A).

Here, in the second seating portion 52 facing the second seating portion 42 in the vertical line VL direction, a fitting hole 52c into which the positioning pin P is to be fitted is opened on the seating surface 52a of the second seating portion 52 (with reference to FIG. 3A, FIG. 3B).

As shown in FIG. 3A, FIG. 3B, the oil passages 35, 35 are provided on the lower surface 310 of the upper valve 31. The oil passages 35, 35 are connected to the hydraulic pressure control circuit in the control valve unit 3. The oil passages 35, 35 extend downward in the vertical line VL direction. The oil passages 35, 35 are provided in positions corresponding to the oil passages 25, 25 extending from the bottom wall portion 22 in the vertical line VL direction.

As shown in FIG. 3A, the control valve unit 3 is fixed to the seating portion 4 by inserting bolts B into the through holes 51b, 52b, 53b and screwing the bolts B into the bolt holes 41b, 42b, 43b of the seating portion 4. In this state, the center line of the fitting hole 52c coincides with the center line C1 of the positioning pin P. The oil passages 35, 35 are connected to the oil passages 25, 25, respectively, via sealing materials Ca, Ca.

Assembling

Figure 4A:
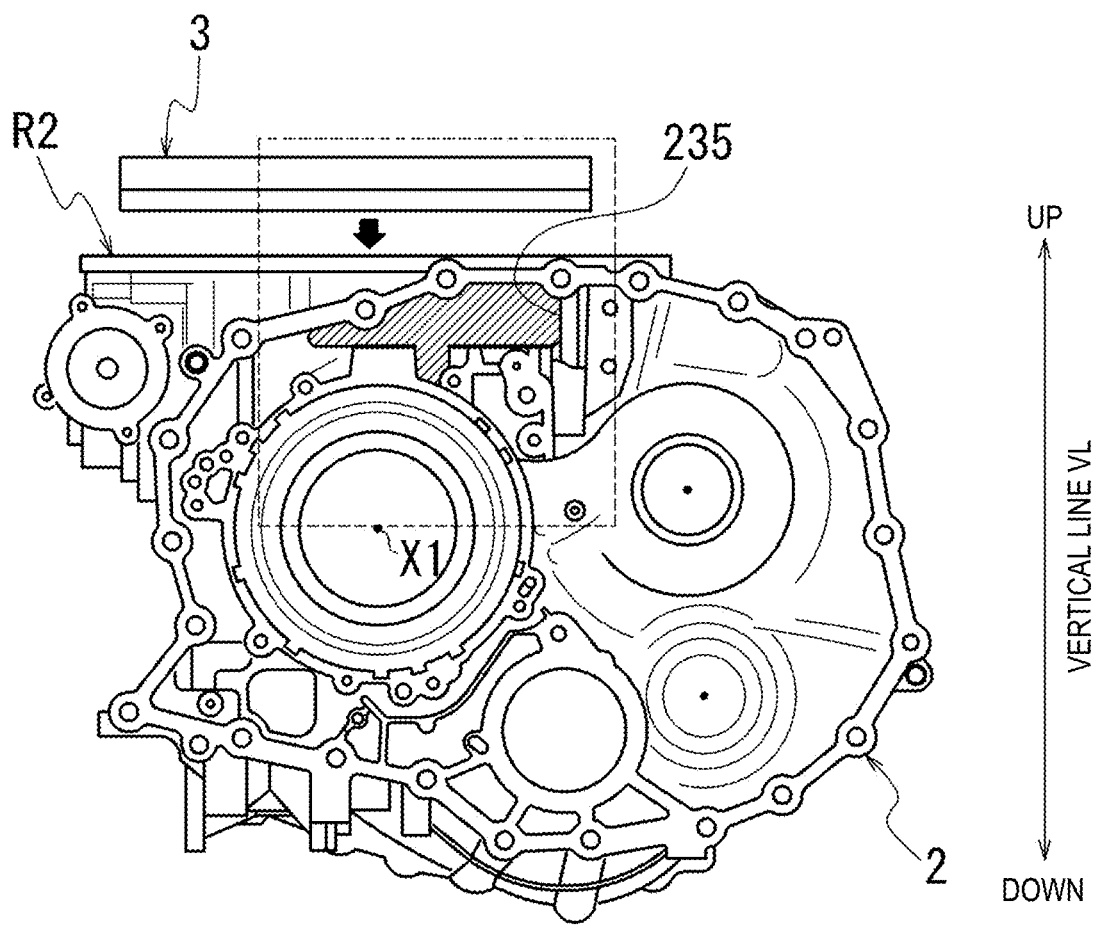
FIG. 4A is a diagram describing a process of assembling a control valve unit to the transmission case, and shows an assembling direction of the control valve unit.
Figure 4B:
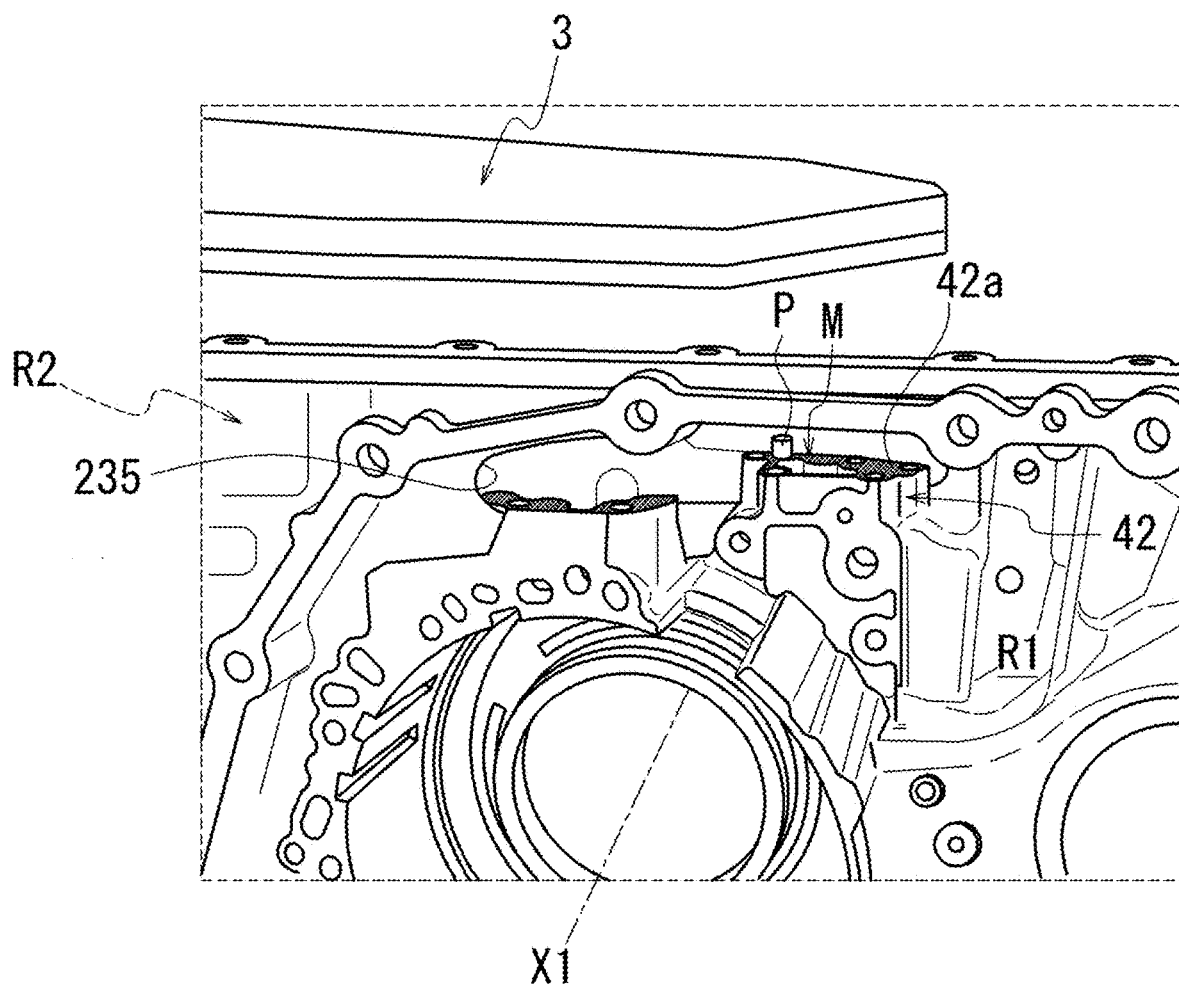
FIG. 4B is a view of a second seating portion viewed from a communication hole.

FIG. 4A, FIG. 4B are diagrams describing a process of assembling the control valve unit 3 to the transmission case 2. FIG. 4A is a diagram showing an assembly direction of the control valve unit 3. FIG. 4B is a view of the second seating portion 42 viewed from the communication hole 235.

Figure 5A:
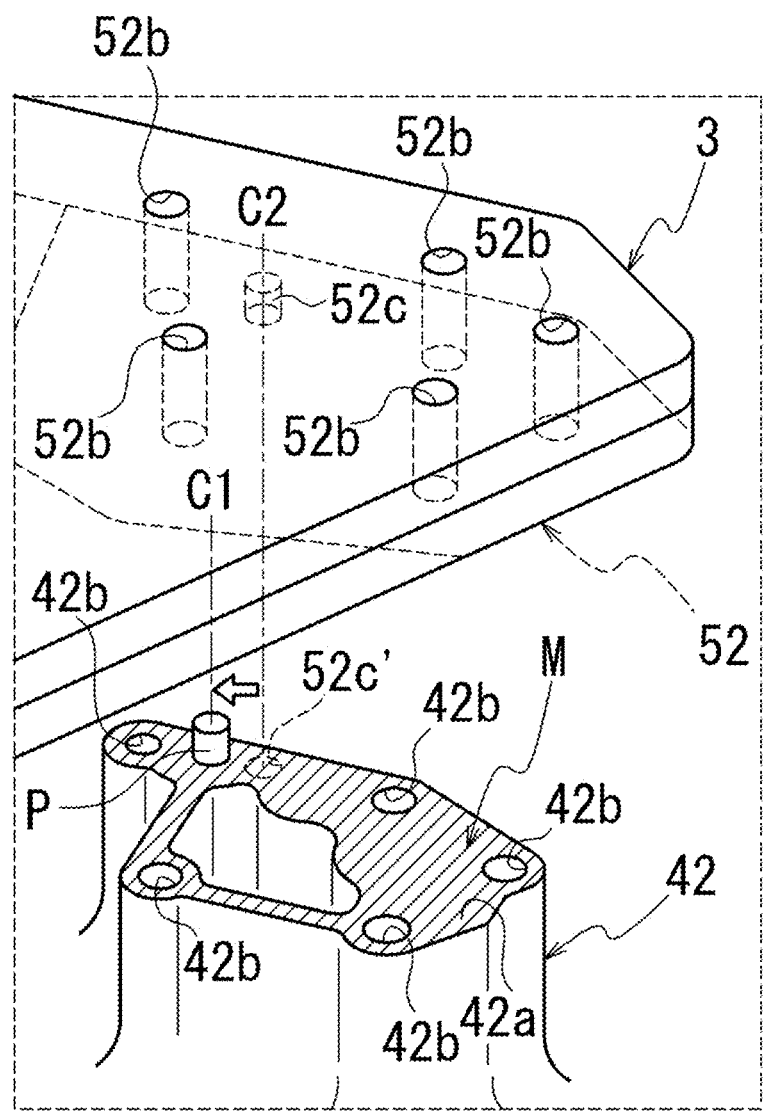
FIG. 5A is a diagram describing a process of assembling the control valve unit to the transmission case, and shows a state in which the second seating portion is viewed from the communication hole.
Figure 5B:
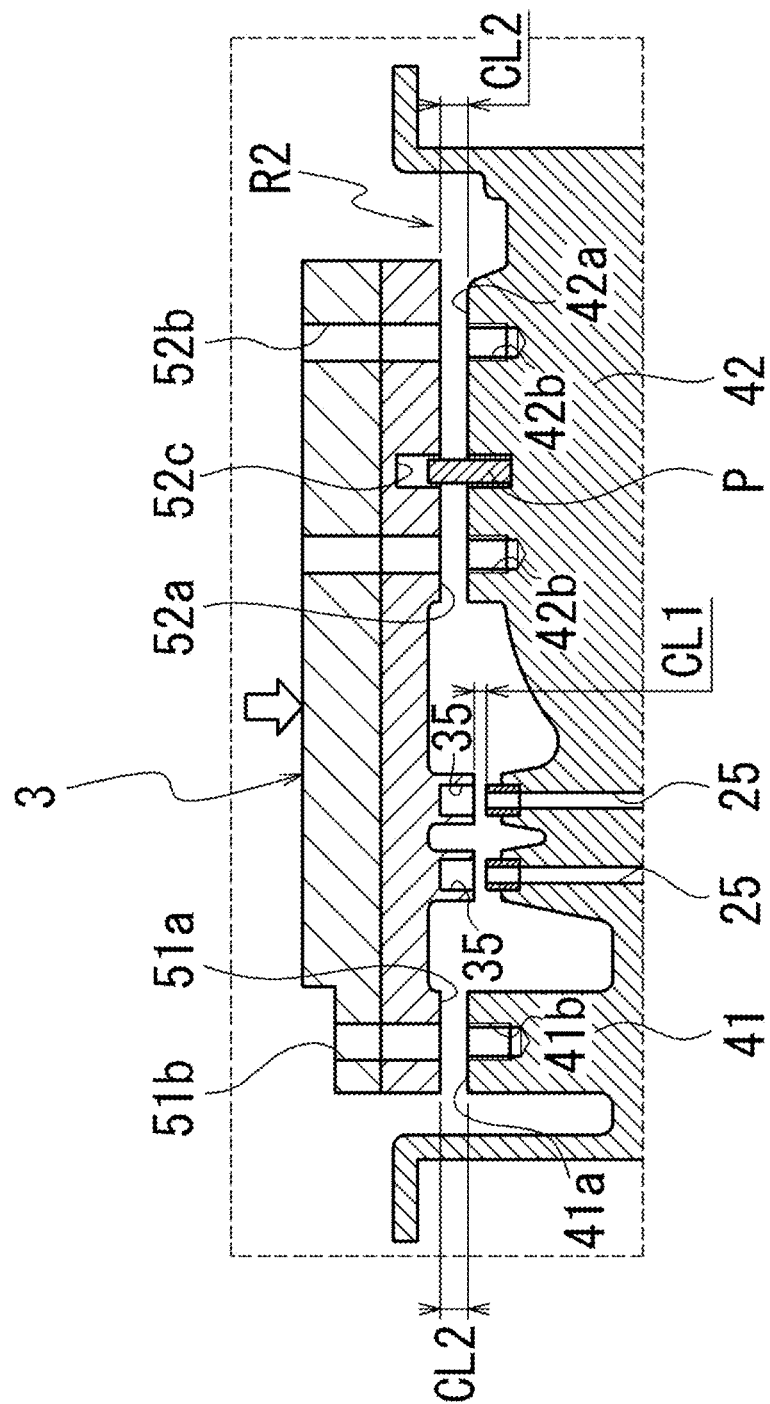
FIG. 5B is a diagram describing a seating process of the control valve unit.

FIG. 5A, FIG. 5B are diagrams describing a process of assembling the control valve unit 3 to the transmission case 2. FIG. 5A is a view showing a state where the second seating portion 42 is viewed from the communication hole 235. FIG. 5B is a diagram describing a seating process of the control valve unit 3.

As shown in FIG. 4A, the operator holds the control valve unit 3 with both hands and inserts the control valve unit 3 from the opening 250 along the vertical line VL direction, so as to house the control valve unit 3 in the valve housing chamber R2 (the direction of the arrow in the diagram).

The operator first fits the fitting hole 52c (with reference to FIG. 5A) of the second seating portion 52 of the control valve unit 3 to the positioning pin P.

Here, when the control valve unit 3 is viewed from the upper side of the vertical line VL direction, the fitting hole 52c is located at the blind spot of the operator. Also, as described above, the control valve unit 3 has an overall shape that substantially matches the shape of the opening 250 (with reference to FIG. 2).

Therefore, the operator cannot visually recognize the fitting hole 52c from, for example, the gap between the peripheral wall portion 21 of the opening 250 and the control valve unit 3. That is, the fitting hole 52c cannot be visually recognized from the opening 250 side.

The operator can see the seating surface 42a of the second seating portion 42 in the valve housing chamber R2 from the space R1 in the rotational axis X1 direction through the communication hole 235 (with reference to FIG. 4B).

Since the seating surface 42a is also a mirror surface portion M that has been finished as a mirror surface, when the control valve unit 3 is brought close to the seating portion 4, the second seating portion 52 (fitting hole 52c) of the control valve unit 3 is reflected in the seating surface 42a (mirror surface M).

The operator can visually recognize the mirror image 52c' (with reference to FIG. 5A) of the fitting hole 52c reflected in the mirror surface portion M from the communication hole 235.

For example, as shown in FIG. 5A, when the control valve unit 3 is brought close to the seating portion 4, the center line C2 of the fitting hole 52c may deviate from the center line C1 of the positioning pin P. In this case, by visually recognizing the mirror image 52c', the operator can grasp that the fitting hole 52c is deviated from the positioning pin P.

The operator can move the control valve unit 3 while looking at the mirror image 52c' so that the center line C2 of the fitting hole 52c is in the direction corresponding to the center line C1 of the positioning pin P, which allows the positioning pin P to fit into the fitting hole 52c.

As shown in FIG. 5B, with the positioning pin P fitted in the fitting hole 52c, the oil passages 35, 35 of the control valve unit 3 face the sealing materials Ca, Ca of the oil passages 25, 25, respectively, with a predetermined space CL1 therebetween in the vertical line VL direction. Also, the seating portion 5 of the control valve unit 3 faces the seating portion 4 of the transmission case 2 with a predetermined space CL2 therebetween in the vertical line VL direction.

In this case, the space CL1 between the oil passages 35 and the sealing materials Ca is set to be narrower than the space CL2 between the seating portion 5 (seating surfaces 51a, 52a, 53a) and the seating portion 4 (seating surfaces 41a, 42a, 43a) (CL1<CL2).

In this state, the control valve unit 3 can rotate around the center line C1. However, as described above, since the control valve unit 3 has an overall shape that substantially matches the shape of the opening 250, the seating position does not deviate significantly in the circumferential direction around the center line C1.

With the positioning pin P fitted in the fitting hole 52c, when the control valve unit 3 is moved further downward, the oil passages 35, 35 of the control valve unit 3 are connected to the oil passages 25, 25 via the sealing materials Ca, Ca, respectively. After that, the seating portion 5 (seating surfaces 51a, 52a, 53a) and the seating portion 4 (seating surfaces 41a, 42a, 43a) come into contact with each other to complete the seating.

After the seating is complete, the bolts B are inserted into the through holes 51b, 52b, 53b and screwed into the bolt holes 41b, 42b, 43b, respectively, to fix the control valve unit 3 to the seating portion 4, so that the housing of the control valve unit 3 into the valve housing chamber R2 is complete (with reference to FIG. 3A).

The transmission case 2 according to this embodiment has the following configuration.

(1) The transmission case 2 has the valve housing chamber R2 (storage area) for the control valve unit 3 (assembling member) inside.

The valve housing chamber R2 has the opening 250 (first opening).

The valve housing chamber R2 has the seating portion 4 on which the control valve unit 3 inserted from the opening direction of the opening 250 is to be seated.

The valve housing chamber R2 has the mirror surface portion M that makes it possible to visually recognize the seating portion 5 (opposite portion facing the seating portion 4) of the control valve unit 3 when the control valve unit 3 is being inserted from the opening direction of the opening 250.

With this configuration, even in a case where the seating portion 5 is located at the blind spot of the operator, the operator can work while visually recognizing the seating portion 5 reflected in the mirror surface portion M.

Therefore, it is possible to assemble the control valve unit 3 to the transmission case 2 without lowering the work efficiency.

The transmission case 2 according to this embodiment has the following configuration.

(2) The valve housing chamber R2 further has the communication hole 235 (second opening) that opens in the rotational axis X1 direction intersecting the opening direction of the opening 250.

When viewed from the opening direction of the communication hole 235, the mirror surface portion M is provided on the seating surface 42a of the second seating portion 42 provided in the area overlapping the communication hole 235.

With this configuration, it is possible to visually recognize the seating portion 5 reflected in the seating surface 42a from the communication hole 235. Therefore, even in a case where the seating portion 5 is located at the blind spot of the operator when viewed from the opening direction of the opening 250, which renders the seating portion 5 more invisible from the opening 250, it is possible to assemble the control valve unit 3 to the transmission case 2 without lowering the work efficiency.

In addition, by mirror-finishing the seating surface 42a of the second seating portion 42, the seating surface 42a having a higher flatness than that obtained by conventional milling can be obtained. Therefore, it is possible to integrate the process since the conventional milling can be omitted.

The transmission case 2 according to this embodiment has the following configuration.

(3) The second seating portion 42 has a positioning pin P.

The second seating portion 52 of the control valve unit 3 has the fitting hole 52c into which the positioning pin P is to be fitted.

With this configuration, since the operator can grasp the positional relation between the fitting hole 52c and the positioning pin P from the mirror image 52c' of the fitting hole 52c reflected in the mirror surface portion M, it is possible to fit the positioning pin P into the fitting hole 52c.

This embodiment illustrates only the positioning pin P provided on the second seating portion 42, but it is not limited to this. The positioning pin P may be provided on the first seating portion 41 or the third seating portion 43, in addition to the second seating portion 42. As a result, it is possible to position the control valve unit 3 in circumferential direction around the center line C1.

Also, a case is illustrated where the seating surface 42a of the second seating portion 42 may be the mirror surface portion M, but it is not limited to this. Any area of the valve housing chamber R2 may be the mirror surface portion M as long as the operator can visually recognize it from the communication hole 235. For example, of the peripheral wall portion 21, the side surface (long wall portion 214: with reference to FIG. 2) opposite to the communication hole 235 sandwiching the second seating portion 42 in the rotational axis X1 direction may be the mirror surface portion M.

This embodiment illustrates the assembly of the control valve unit 3 to the transmission case 2, but it is not limited to this. For example, when the ATCU is assembled in the oil pump housing chamber of the transmission case 2, the mirror surface portion M reflecting the seating surface of the ATCU may be provided in the oil pump housing chamber.

The invention according to this embodiment is not limited to the embodiment described above, and may be subjected to various modifications and improvements within the scope of the technical idea thereof.

This application claims the priority based on Japanese Patent Application No. 2019-204205 filed with the Japanese Patent Office on Nov. 11, 2019, entire of which is incorporated herein by reference.

The invention claimed is:

1. A transmission case having a storage area inside for an assembling member, comprising:
 a first opening in the storage area;
 a seating portion provided in the storage area and on which the assembling member inserted from an opening direction of the first opening is to be seated; and
 a mirror surface portion allowing an opposite portion of the assembling member facing the seating portion to be visually recognized when the assembling member is being inserted to the first opening from the opening direction.

2. The transmission case according to claim 1, wherein:
 the storage area further has a second opening in a direction intersecting the opening direction of the first opening; and
 the mirror surface portion is provided in an area overlapping the second opening when viewed from an opening direction of the second opening.

3. The transmission case according to claim 2, wherein:
 the mirror surface portion is provided on a seating surface of the seating portion.

4. The transmission case according to claim 1, wherein:
 the seating portion has a positioning pin; and
 the opposite portion has a fitting hole into which the positioning pin is to be fitted.

5. The transmission case according to claim 1, wherein:
 the assembling member is a control valve unit; and
 the storage area is a valve housing chamber of the transmission case.

* * * * *